United States Patent [19]
Jaffe

[11] 3,713,155
[45] Jan. 23, 1973

[54] MONOPULSE RADAR RECEIVER
[75] Inventor: Richard M. Jaffe, Inglewood, Calif.
[73] Assignee: Hughes Aircraft Company, Culver City, Calif.
[22] Filed: June 23, 1958
[21] Appl. No.: 744,628

[52] U.S. Cl. .............................................. 343/16 M
[51] Int. Cl. ................................................ G01s 9/22
[58] Field of Search ..... 179/15 A, 15, 15 ST; 178/50; 340/181, 184; 343/16, 16.1, 121, 16 M

[56] References Cited

UNITED STATES PATENTS

| | | | |
|---|---|---|---|
| 3,104,389 | 9/1963 | Ward | 343/16 M |
| 3,141,164 | 6/1958 | Holcomb et al | 343/16 M |

Primary Examiner—Benjamin A. Borchelt
Assistant Examiner—H. A. Birmiel
Attorney—James K. Haskell and William G. Everett

EXEMPLARY CLAIM

1. A receiver comprising: a monopulse antenna; a sum and difference network coupled to said antenna for developing a sum signal and first and second difference signals, said signals having relative amplitudes indicative of target information; first and second modulators coupled to said network for receiving said first and second difference signals; an oscillator; first phase shifting means coupled between said oscillator and said first modulator for controlling said first modulator to phase shift said first difference signal and to modulate said first difference signal into first sideband signals; second phase shifting means coupled between said oscillator and said second modulator for controlling said second modulator to phase shift said second difference signal and to modulate said second difference signal into second sideband signals; summing means coupled to said first and second modulators for receiving said phase shifted first and second sideband signals from said first and second modulator and coupled to said network for receiving said sum signal and for combining said phase shifted signals and said sum signal into a common signal; an amplifier coupled to said summing means; and detecting means coupled to said amplifier and coupled to said first and said second phase shifting means for responding to said common signal to develop signals indicative of the relative amplitudes of said sum and difference signals developed in said network.

8 Claims, 3 Drawing Figures

INVENTOR.
RICHARD M. JAFFE,
BY
Walter J. Adam
ATTORNEY

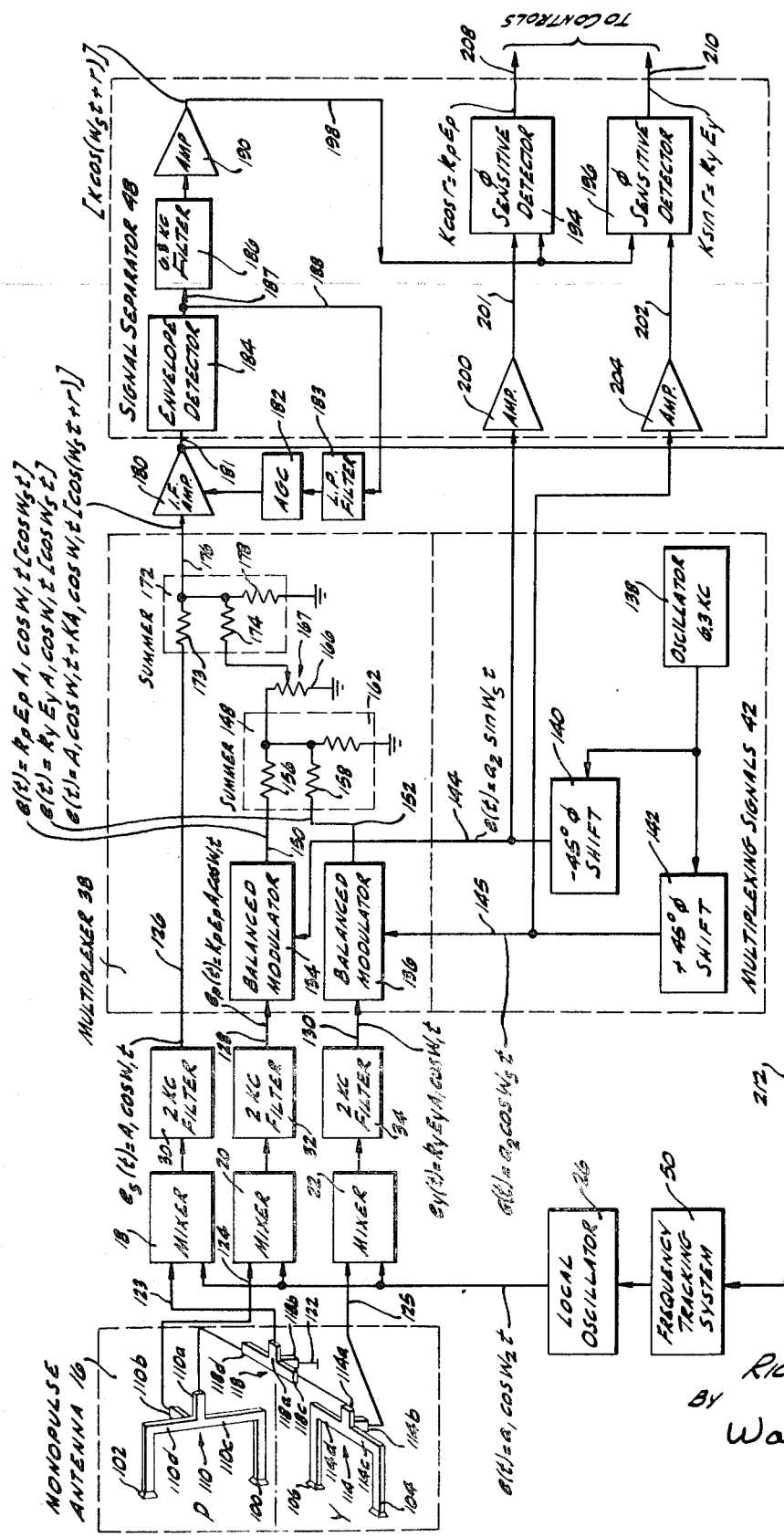

MONOPULSE RADAR RECEIVER

This invention relates to monopulse radar receiver systems and particularly to an improved and simplified arrangement for amplifying the signals obtained from a monopulse antenna.

In the prior art, target angular coordinates have been obtained by combining the output signals of four horns of a non-rotating monopulse antenna into signal combinations or receiver input signals, such as sum and difference signals, and heterodyning the input signals to IF (intermediate frequency). Three or four separate channels and IF amplifiers are utilized to amplify and to pass each of the IF input signals through the receiver. The IF input signals are then detected and processed to obtain a measure of the relative amplitude of the signals received by the antenna, and therefore, a measure of the angular displacement of the antenna axis from the line of sight to the source of signals, that is, the target. One disadvantage of this arrangement is that a plurality of IF amplifiers are required which must be matched in either phase or gain or both to accurately retain the information received from the antenna. In order to provide IF amplifiers which meet these requirements, an increased number of amplifier components, all with a high degree of quality are required.

Also in the prior art, attempts to combine or to multiplex the IF input signals from the monopulse antenna and to feed them into a common amplifier channel has been found to have many disadvantages. In many prior art systems, isolation between each of the input signals when combined into a common channel is not maintained and noise or cross talk from one input signal interferes with other input signals to provide unreliable detection. Signals which have sidebands originating from jamming sources or from amplitude scintillation of an echo signal are also passed into the multiplexer together with the input signals to increase further the unreliability of the detection. For this reason most of the prior art monopulse systems utilize separate IF amplifiers to amplify the input signals instead of a multiplexing system.

Some other disadvantages of multiplexing operations which are present with frequency multiplexing systems of the prior art if utilized with monopulse antennas are that envelope detectors are required for separating the output signal. These envelope detectors pass appreciable amounts of noise signals to accompany the output signal thus providing spurious signals to antenna controls which may utilize the output signals. Also frequency multiplexing requires the IF filters in the system to have a wide bandwidth, thus presenting a large thermal noise susceptibility to the system. Furthermore frequency multiplexing requires a plurality of oscillators for controlling the multiplexing operation. Conventional phase multiplexing has the disadvantage that it is limited to combining two input signals since three input signals, as characteristically required for a monopulse system, when multiplexed will have components of at least one input signal which will add to another input signal when detected.

A further disadvantage of prior art monopulse receiver systems is that existing conical scan amplifying and detecting systems may not be utilized with a monopulse antenna.

It is therefore an object of this invention to provide a receiver which filters the IF input signals with narrow band filters, then utilizes a combination of phase and frequency multiplexing to combine the input signals into a common signal.

It is a further object of this invention to provide a monopulse radar receiver which filters the sum and difference IF signals to eliminate undesired sideband signals and then phase and frequency multiplexes the difference signals and adds these multiplexed signals to the sum signal to form a common signal which may then be amplified and detected.

It is a still further object of this invention to provide an improved multiplexing system which combines phase and frequency multiplexing to overcome the disadvantages of conventional phase multiplexing and frequency multiplexing.

It is another object of this invention to provide an improved multiplexing system for use with a monopulse radar receiver which develops a common signal imbodying the input yaw and pitch signals which are distinguished from each other in phase and appear as sideband components while the sum reference signal appears as the carrier signal, thus allowing the common signal to be detected in the manner of a conventional conical scan system.

According to one feature of this invention, a monopulse antenna intercepts radio-frequency signals from a target. These radio-frequency signals are combined into pitch and yaw difference signals and a sum signal, which signals have amplitudes indicating target direction. The sum and each of the two difference signals are then separately heterodyned to intermediate frequency and passed through a narrowband filter to eliminate undesired sideband noise signals received from the antenna. The pitch and yaw difference signals are then passed into balanced modulators where they are modulated into sideband frequencies, each difference signal being phase shifted from the other to form quadrature components in response to reference waves which are received from an oscillator system. The sideband signals are then combined with the filtered sum signal which combines as the carrier wave to the sideband signals, to form a common signal similar to that derived from a conventional conical scan system. The common signal is then amplified and passed to a signal separator where the envelope of the carrier wave is detected for developing an output signal to normalize the amplification of the amplifier. The pitch and yaw components are phase detected by utilizing reference waves from the oscillator to form output signals which indicate target direction. The output signals have relative amplitudes which are proportional to the pitch and yaw difference signals and thereby indicate target direction with a high degree of accuracy and relatively unaffected by noise.

The novel features of this invention, as well as the invention itself, both as to its organization and method of operation, will best be understood from the accompanying description, taken in connection with the accompanying drawings, in which like reference characters refer to like parts, and in which:

FIG. 2 is a more detailed block diagram of FIG. 1 illustrating one embodiment of this invention.

Figure 1:
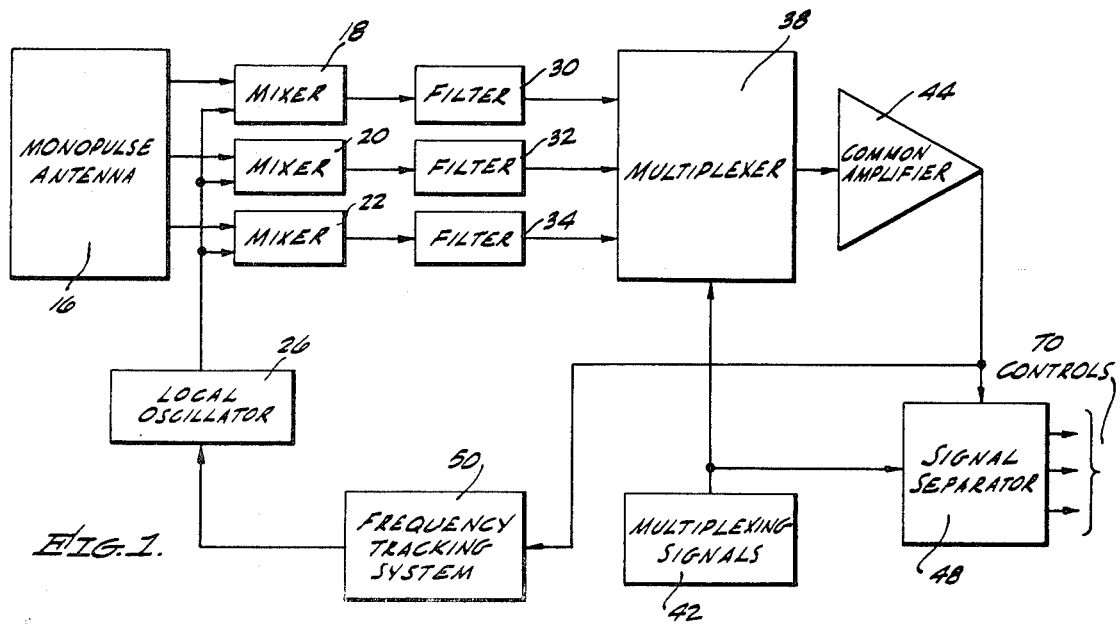
FIG. 1 is a block diagram of the receiver system of this invention.

Referring first to FIG. 1, a block diagram is shown illustrating the radar receiver of this invention. A monopulse antenna 16 is provided to receive RF (radio frequency) signals which may contain doppler information, from a source of signals, such as a target (not shown). The RF signals may be echo signals or signals from any signal source. The RF signals may be combined into combined signals the amplitude of which indicate direction of an object or of a signal source relative to an axis of the antenna 16. A plurality of mixers which may be mixers 18, 20, and 22 are connected to the antenna 16 to receive the combined RF signals. A local oscillator 26 is connected to mixers 18, 20, and 22 to heterodyne the combined RF signals to IF signals. Filters 30, 32, and 34 are connected to the mixers 18, 20, and 22, respectively to receive the IF signals. A multiplexer 38 connected to the outputs of filters 30, 32, and 34 to receive the filtered IF signals. Multiplexer 38 is connected to a multiplexing signal circuit 42 which as will be explained, acts to combine the plurality of IF input signals into a common signal while separating a frequency, for example, the IF input signals to provide a distinguishing characteristic to each of the input signals. A common IF amplifier 44 is connected to the multiplexer 38 to receive and to amplify the common signal. A signal separator 48 is connected to the output of the common amplifier 44. The signal separator 48 may also be connected to the multiplexing signal circuit 42 to receive the same signals used in the multiplexer 38, as a reference signal for separating the signals. The outputs of the signal separator 48 are connected to control circuitry (not shown). Thus the common signal after passing through the common amplifier 44 is separated into signal components corresponding to the combined input signals and passed to control circuitry which may be aircraft or antenna controls, for example.

A frequency tracking system 50 is connected between the output of the common amplifier 44 and the local oscillator 26 in order to control the intermediate frequency derived from the mixers 18, 20, and 22, for passing the desired signals through the pass band of the filters 30, 32, and 34.

In operation, the monopulse antenna 16 may receive RF signals which are combined in a manner depending on the particular type of monopulse antenna utilized, to indicate direction of the source of signals relative to the antenna axis. The combined or input signals are passed to the mixers 18, 20 and 22. It is to be noted that although three combined signals are shown as inputs to the mixers 18, 20, and 22, any number of input lines and mixers representing desired information may be utilized with this invention. The input signals are then heterodyned to intermediate frequency in response to the wave developed by the local oscillator 26 and passed to the filters 30, 32, and 34 at intermediate frequency. The filters 30, 32, and 34 are narrow-band filters and pass only a narrow-band at the frequency of the desired signal. The system in accordance with this invention utilizes the monopulse antenna 16 which simultaneously obtains all angular information required to define the location of a source as compared to a conical scan type that requires a period of time for determining the position of a source of signals.

Figure 3:
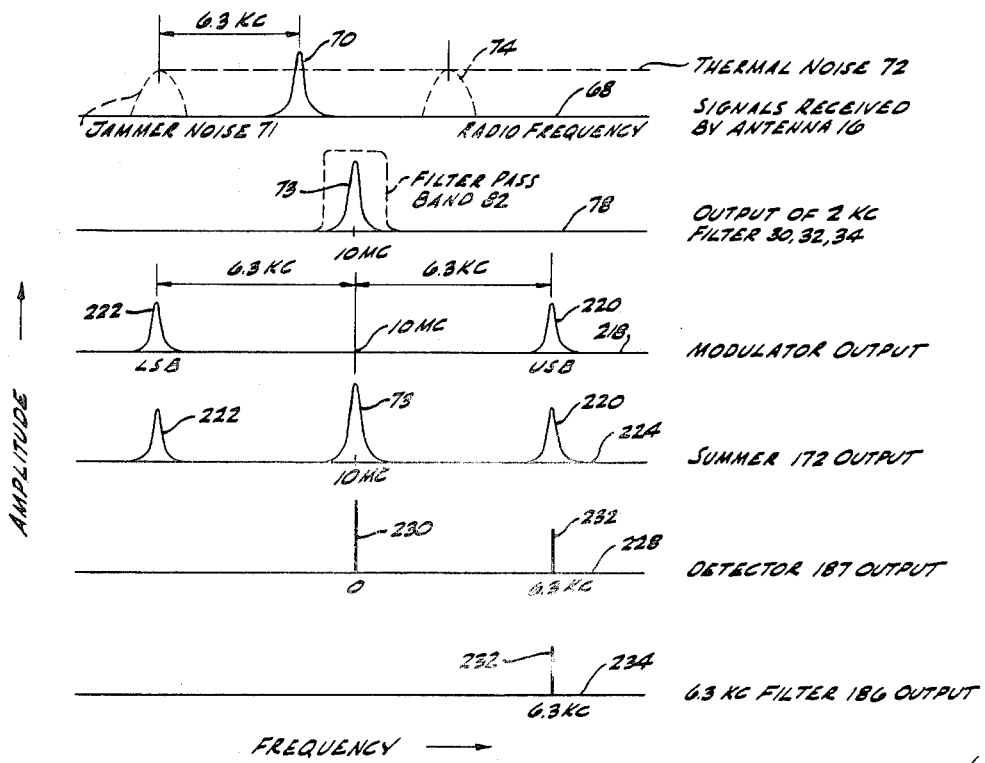
FIG. 3 is a graph of frequency versus amplitude for explaining the operation of the systems of FIGS. 1 and 2.

Referring temporarily to FIG. 3, which is a series of frequency graphs showing frequency versus amplitude, the operation of the filter arrangement will be further explained. In a frequency diagram 68 showing the signal received by the antenna 16, the desired monopulse carrier signal 70 is shown at a radio frequency as received by the antenna 16. A noise component is shown as thermal noise signal 72 by a dotted line which may have amplitudes varying with frequency. A countermeasure jamming component is shown as a jammer noise signal 71 and 74 shown in dotted lines and may interfere with detection of the desired signals in the receiver by introducing noise components during the multiplexing and by adding to the other signals intercepted by the antenna 16 after multiplexing. Also a signal similar to the jammer noise signal 71 and 74 may be caused by amplitude scintillation when the antenna 16 is receiving reflected signals, as is well known. The jammer noise signals 71 and 74 received by the antenna 16 are typical jamming signals generated by enemy countermeasure system. It is also to be noted that the monopulse signal 70 has sideband noise associated with it.

The system in accordance with this invention operates by intercepting either continuous wave signals or pulsed signals, as each has a component such as the signal 70 that will pass through the filters 30, 32, and 34. The frequency diagram 68 shows continuous wave signals intercepted by the antenna 16 for example. The spectral regions after passing through the filters 30, 32 and 34 are similar for both continuous wave and pulsed signals intercepted by the antenna 16. Thus, the system in accordance with this invention utilizes only a single spectral region indicated by the signal 70 of the graph 68 which passes through the filters 30, 32 and 34. If pulses are intercepted by the antenna 16, pulse information is not utilized in the processing system after the narrow band filtering, as only the information contained in the spectral region passed through the filters 30, 32 and 34 is required.

As will be explained, the input signals may be combined into three signals in antenna system 16, so as to indicate antenna directional error, varying only in amplitude from the signals received by the antenna 16, thus having a similar appearance at the outputs of the antenna 16 as shown by the graph 68. The combined signals from the antenna 16 pass to the mixers 18, 20, and 22 where they are heterodyned to intermediate frequency and passed to the filters 30, 32, and 34, respectively. The output of each of the filters 30, 32, and 34 is shown by a graph 78 at intermediate frequency which may be at a frequency of 10 MC (megacycles per second). The filter pass band 82 is shown 2 KC (kilocycles per second) wide in the frequency spectrum to pass only the desired carrier or monopulse signal 73 which now has a nominal intermediate frequency of 10 MC. Thus as shown in the graph 78, the jammer noise signals 71 and 74 and the thermal noise signals 72 as shown in graph 68 are prevented from passing through filters 30, 32, and 34. Therefore, desired signals free of interfering sidebands and noise are obtained. The noise associated with a signal 73 obtained from one of the filters 30, 32, or 34, if not allowed to combine with other signals, does not interfere with the operation of the system.

The multiplexer 38 receives the intermediate frequency signals from filter 30, 32, and 34 and, as is well known in the art, combines them into a common signal while providing distinguishing characteristics for separating the signals after amplification. The multiplexer 38 isolates the intermediate frequency signals from each other in the combined signal sufficiently, as for example by frequency separation, so as to maintain isolation between individual intermediate frequency signals. The multiplexing signal generator 42 supplies a reference signal to the multiplexer 38 to combine the intermediate frequency signals and by some type of multiplexing, to provide a means to distinguish the separate or individual IF signals of the combined signal in the signal separator, as will be explained.

Although the multiplexing operation of the multiplexer 38 may be effected by any of the conventional methods such as frequency multiplexing or time multiplexing, an improved multiplexing system is provided in accordance with this invention. The multiplexer 38 is designed to shift the intermediate frequency signals derived from the filters 30, 32, and 34 so as to separate the signals from each other to prevent one IF signal from interfering with the others in the common output channel of the multiplexer 38. This separation is made possible by the narrow-band filtering which removes the undesired sideband signals including noise from each of the intermediate frequency signals passed into the multiplexer 38.

The common signal passes from the multiplexer 38 to the common IF amplifier 44 where the majority of the amplification of the receiver is carried out. The problem of phase and amplitude balancing of a plurality of IF amplifiers in the conventional system utilizing a plurality of channels for amplification is thus eliminated.

The signal separator 48 then receives the amplified signal from the amplifier 44 and responding to the reference signal from multiplexing signal source 42, separates the multiplexed signals into output error signals. The output error signals from the signal separator 48 correspond in relative amplitude and polarity to the combined signals obtained from the monopulse antenna system 16. These output error signals from the signal separator 48 indicate the direction of the antenna axis relative to the line of sight to the source of signals and are impressed on controls which may respond to directional changes.

In order to provide signal discrimination of the basis of small differences of frequency due to doppler shift, the input signal frequency is maintained in the center of the narrow pass band of the filters 30, 32, and 34. A conventional frequency tracking system 50 is utilized to provide velocity tracking for controlling the local oscillator 26, which in turn controls the intermediate frequency passed to the filters 30, 32, and 34. The frequency of the signal derived from the common amplifier 44 controls through the frequency tracking system 50 the frequency of the local oscillator 26.

Referring now to FIG. 2, a detailed block diagram is shown of the monopulse receiver of FIG. 1 utilizing an improved multiplexing system for separating the IF signals, which system is a combination of frequency and phase multiplexing. The monopulse antenna 16 may be a conventional four feed amplitude comparison antenna. Two microwave receiving antenna, shown as horns 100 and 102 are arranged in a vertical plane to respond to the variation indicating pitch of the source of signals from an antenna axis 101. Two other horns 104 and 106 are arranged in a horizontal plane to respond to the variation indicating yaw of the source of signals from the antenna axis 101. The antenna 16 response in each plane varies in amplitude with the amount of displacement of the source of signals from the antenna axis 101. As is well known, the four output signals from the antenna horns 100, 102, 104, and 106 may be combined to give a sum signal of the four signals from horns 100, 102, 104, and 106 and to give a pitch difference signal and a yaw difference signal, which three signals contain the information to indicate pitch and yaw deflection of the signal source from the antenna axis. The amplitude of the pitch and yaw difference signals indicate the deflection of the source of signals in the vertical and horizontal direction, respectively, and the sum signal is utilized as a reference signal. The sum and difference system may comprise a waveguide junction 110 which is a conventional magic T junction. A magic T junction has four branches called waveguides 110a, 110b, 110 c, and 110d. The waveguide 110a connects to the junction in the H plane to form the parallel junction, and the line 110b connects to the junction in the E plane to form the series junction. As is well known, power fed simultaneously and in phase into the waveguides 110c and 110d enters the waveguide 110a in additive fashion and enters the waveguide 110b in subtractive fashion. The signal in the waveguide 110b represents the pitch amplitude difference of the two received pitch signals from the horns 100 and 102, and is passed through a lead 124 to the mixer 20. The sum of the signals from the horns 100 and 102 passes into the waveguide 110a.

A similar magic T structure or waveguide junction 114 is connected to horns 104 and 106 by a waveguide 114c and 114d, respectively, to receive the yaw signals. The difference signal which represents the yaw amplitude difference of the signals from the horns 104 and 106 passes into a waveguide 114b of the junction 114 and is impressed on the mixer 22 through a lead 125. The sum of the signals from the horns 104 and 106 is obtained from a waveguide 114a of the waveguide junction 114.

The sum signals in the waveguides 110a and 114a pass simultaneously and in phase into another magic T structure or waveguide junction 118. The signal from the junction 118 enters a waveguide 118a in additive fashion and is derived from a waveguide 118b in subtractive fashion. The sum signal in the waveguide 118a of the junction 118, which signal has an amplitude representative of the sums of the signals received from the pitch horns 100 and 102 and yaw horns 104 and 106, is passed to the mixer 18 through a lead 123. The difference signal in the waveguide 118b of the junction 118 is not utilized and is terminated by a suitable dissipative load 122 to prevent reflections of the signal.

In order to maintain the signals in phase as they pass into the waveguide structures 110 and 114 the distance from the horn 100 and from the horn 102 to the center of the structure 110 must be equal, and the distance from the horn 104 and from the horn 106 to the center of the structure 114 must also be equal. Also, to maintain the signals in phase as they pass into the waveguides 118c and 118d structure 118, the distance from the center of the structure 110 to the center of the structure 118 must be equal to the distance from the center of the structure 114 to the center of the structure 118. The sum and difference signals available from the lead 123 and the leads 124 and 125 pass through the mixers 18, 20, and 22 to which they are individually connected, where they are heterodyned to intermediate frequency, by the action of the local oscillator 26. The intermediate frequency signals are then passed through the filters 30, 32, and 34 to separate leads 126, 128, and 130. The filters 30, 32, and 34 pass a frequency band which has a narrow pass band of 2 KC centered at the intermediate frequency. The multiplexer indicated by dotted rectangle 38 is connected by a lead 126, 128, and 130 to the outputs of the filters 30, 32, and 34, respectively.

A balanced modulator 134 is connected to the filter 32 by the lead 128 and a balanced modulator 136 is connected to the filter 34 by the lead 130. The modulators 134 and 136 are suppressed carrier balanced modulators which are well known in the art. The multiplexer 38 is controlled by the multiplexing signal source 42. An oscillator 138 is connected to supply signals to a −45° phase shifter 140 and a +45° phase shifter, which will be explained subsequently. The output terminal of phase shifter 140 is connected to the balanced modulator 134 by a lead 144 and the output terminal of the phase shifter 142 is connected by a lead 145 to the balanced modulator 136.

A summer indicated by a dotted rectangle 148 is connected to the output terminal of the balanced modulator 134 through a lead 150 and is also connected to the balanced modulator 136 through a lead 152. The summer 148 may comprise a resistor 156 connected to the lead 150 and a resistor 158 connected to the lead 152. The other ends of the resistors 156 and 158 are connected to an output lead 160, which is also connected to ground by way of a resistor 162. Thus, the two intermediate frequency signals obtained from the balanced modulators 134 and 136 are combined in the summer 148. The lead 160 is connected to a potentiometer 166 which in turn is grounded. The variable tap of the potentiometer 166 provides adjustment of the amplitude of the modulated difference signals.

The output signal of potentiometer 166 is passed through a lead 167 to a summer network indicated by a dotted rectangle 172 which receives not only the sum of the modulated signals on the lead 167 but is also connected to the filter 30 through the lead 126 to receive the sum signal from the monopulse antenna 16. The summer 172 may comprise a resistor 174 with one end connected to the potentiometer 166 through the lead 167 and a resistor 173 with one end connected to the lead 126. The other ends of the resistors 173 and 174 are connected to an output lead 176 which is also connected to ground by way of a resister 178. Thus the three input signals from the antenna 16 are combined in the multiplexer 38 to appear in a single channel on an output lead 176 as a common signal. An IF amplifier 180 is connected to the output lead 176. The amplifier 180 carries out the greater portion of the amplification for the receiver, thus eliminating the amplitude and phase balancing problems inherent in the multiple channels of the prior art.

An automatic gain control (AGC) circuit 182 is provided to normalize the amplified signal from the IF amplifier 180 in response to the sum signal from the antenna 16, as will be explained. The output signal of the AGC circuit 182 is impressed on the input of the amplifier 180. A low pass filter 183 is connected as an input to the automatic gain control circuit 182.

The output terminal of the amplifier 180 is connected to the signal separator indicated by a dotted rectangle 48 by a lead 181. The signal separator 48 comprises an envelope detector 184 connected to the lead 181 to receive the common amplified signal from the amplifier 180. A filter 186 is connected to the output of the envelope detector 184 by a lead 187. The lead 187 connects to the input of the low pass filter 183 by a lead 188 to provide the automatic gain control loop to the amplifier 180. An amplifier 190 is connected to the output of the filter 186.

A phase sensitive detector 194 and a phase sensitive detector 196 are connected in parallel to the amplifier 190 by a lead 198 to receive and to separate the amplified common signal. The phase sensitive detector 194 is connected through a lead 201 to the lead 144 at the output of the phase shifter 140 by way of an amplifier 200. The lead 201 supplies a reference signal to detector 194 for separating the two components which are 90 degrees out of phase from each other from the common signal on the lead 198. The phase sensitive detector 196 is connected through a lead 202 to the lead 145 at the output of the phase shifter 142 by way of an amplifier 204 to provide a reference signal to the detector 196. Phase sensitive detectors 194 and 196 are circuits well known in the art which respond to the portion of the common signal on the lead 198 which is in phase with the reference signals on the lead 202, respectively, as will be discussed. Leads 208 and 210 connect the outputs of the detectors 194 and 196 to the control circuitry (not shown).

The frequency tracking system 50 is connected by a lead 212 to the lead 181 at the output of the amplifier 180. The frequency tracking system 50 is connected to the local oscillator 26 to pass a direct current signal to control the frequency of the wave applied to the mixers 18, 20, and 22. Thus, the intermediate frequency signals from the mixers 18, 20, and 22 are maintained centered at the frequency pass band of the filters 30, 32, and 34. The frequency tracking system 50 is well known in the art, and provides velocity tracking of a moving source of signals by responding to frequency changes in relation to a reference frequency to control the frequency of the wave from the local oscillator 26.

The monopulse receiver may also contain provisions for gating such as a conventional range jitter system connected between the mixers 18, 20, and 22 and the filters 30, 32, and 34. As is well known, this gating circuit is sometimes utilized when a transmitter and a receiver are operated in a conventional pulse-doppler radar system.

Referring now to FIG. 3 as well as to FIG. 2, the operation of the receiver of FIG. 2 will now be explained in greater detail. As discussed, the sum and difference signals at radio frequency are received from the monopulse antenna 16 and are passed to the mixers 18, 20, and 22 where they are heterodyned to intermediate frequency. The intermediate frequency signals are then passed through the filters 30, 32, and 34 which have a narrow frequency pass band centered at the intermediate frequency of 10 MC. As explained by the graph 68 of FIG. 3, the carrier signal 70 obtained from the leads 123, 124, and 125 is at radio frequency intercepted by the antenna 16, accompanied by interfering signals such as thermal noise signal 72 and jammer noise signals 71 and 74. As seen in the graph 78, each of the mixers 18, 20, and 22 heterodyne the radio frequency to an intermediate frequency of 10 MC which is maintained by the action of the frequency tracking system 50. The interfering signals such as the thermal noise signal 72 and the jammer noise signals 71 and 74 are also present at the intermediate frequency at the outputs of each of the mixers 18, 20, and 22. The graph 78 shows the 2 KC filter pass band frequency 82 which allows only the carrier signal 73 to pass through each of the filters 30, 32, and 34. Thus, the interfering or noise signals are prevented from passing into the multiplexer 38.

The sum signal on the lead 126 is represented by the equation $$e_s(t) = A_1 \cos w_1 t$$

where $e_s$ is voltage varying with time $t$, $A_1$ is the maximum amplitude of the signal, and $w$ is the angular velocity. The sine wave derived from the local oscillator 26 is represented by $e(t) = a_1 \cos w_2 t$ where $w_2$ is the angular velocity. It is to be noted that $w_1 = w_r - w_2$, where $w_r$ is the angular velocity of the radio frequency wave received by the antenna 16.

The pitch difference signal on the lead 128 is represented by the equation $$e_p(t) = k_p E_p A_1 \cos w_1 t$$

where $e_p(t)$ is the voltage varying with time $t$ and $E_p$ is the error angle in degrees between the line of sight of the source of signals and the zero error center axis 101 of the antenna 16 which is the center axis between the horns 100 and 102. The factor $k_p$ represents the fraction of the pitch difference signal relative to the sum signal $e_s(t)$ which occurs per degree of error angle.

The yaw difference signal on lead 130 is represented by the equation $$e_y(t) = k_y E_y A_1 \cos w_1 t$$

where $e_y(t)$ is the voltage varying with time $t$ and $E_y$ is the error angle in degrees from the antenna 16 to the line of sight to the source of signals and the zero error center axis 101. The factor $k_y$ represents the fraction of the yaw difference signal relative to the sum signal $e_s(t)$ which occurs per degree of error angle of the source of signals from the center axis 101 of the antenna 16. Thus the difference signals on the leads 128 and 130 are indicative of the pitch and yaw error components from the antenna 16 and the sum signal on the lead 126 is indicative of the sum component of the error signals from the antenna 16. The signal 73 of the graph 78 represents the difference signals and the sum signals on the leads 126, 128, and 130.

The signal from the phase shifter 140 is represented by $e(t) = a_2 \sin w_s t$ where $w_s = 2\pi f_s$ and $w_s$ is the equivalent in radians per second of the multiplexing frequency of 6.3 KC from the oscillator 138. The signal from the phase shifter 142 is represented by $$e(t) = a_2 \cos w_s t.$$

The phase shifter 140 shifts the 6.3 KC signal ($f_s$) from the oscillator 138, 45° in the lagging or the negative direction and the phase shifter 142 shifts the 6.3 KC signal ($f_s$), 45° in the leading or the positive direction to yield the output signals on the leads 144 and 145 separated 90° in phase as indicated by the sine and cosine equations on the leads 144 and 145, respectively. Thus the output signals from the balanced modulators 134 and 136 are distinguishable by their phase difference, as they are shifted into quadrature components, 90° out of phase with respect to each other. The waves from the 6.3 KC oscillator 138 cause the signals on leads 128 and 130 to be balance modulated in the balanced modulators 134 and 136 while suppressing the carrier wave 73.

A graph 218 in FIG. 3 shows the output of the balanced modulators 134 and 136, graph 218 representing the signal on either the lead 150 or the lead 152. The carrier signal 73 of the graph 78 which is at a frequency of 10 MC, is suppressed and an upper sideband signal 220 and a lower sideband signal 222 are formed as a result of the modulations. The sideband signals 220 and 222 are shifted 6.3 KC on either side of the 10 MC carrier frequency. It is to be again noted that the outputs of the two balanced modulators 134 and 136 are quadrature components 90° out of phase with respect to each other.

Thus the sideband signals derived from the carrier signal 73 are each shifted from the frequency of the filters 20 and 22 by an amount greater than the filter pass band frequency of 2 KC. This frequency shifting separates the signals so that when combined with the sum signal, as will be discussed, the difference signals from the balanced modulators 134 and 136 are isolated and prevented from interfering with the sum signal.

The equation for the signal on the lead 150 obtained from the balanced modulator 134 is $$e(t) = K_p E_p A_1 \cos w_1 t [\sin w_s t]$$

and the equation for the signal on lead 152 derived from the balanced modulator 136 is $$e(t) = K_y E_m A_1 \cos w_1 t [\cos w_s t].$$

As seen by these equations, the signals on the leads 150 and 152 are of the same form as the sideband signals received from a conventional mechanical conical scan antenna. Thus, the monopulse antenna 16 provides a signal which when balance-modulated with quadrature components appears the same form as those signals received from a conical scan system. In effect the scan-modulated components of the signal simulating flow from a mechanical scanning antenna are added electronically by means of the oscillator 138 after the difference signals have passed through the narrow band filters 32 and 34. Therefore, this circuit allows filtering out interfering signals to obtain an IF signal which when added to the sum signal on the lead 126, as will be discussed, may be treated similarly to that obtained from a mechanical scan system.

The sideband signals on the leads 150 and 152 are at the same frequency but are distinguishable from each other since they are in phase quadrature arrangement by the 90° phase difference. The signals 220 and 222 of the graph 218 which both appear on the leads 128 and 130 pass through the modulators 134 and 136 and into the summer network 148 where currents passing through the resistor 162 develop a single voltage signal. The signal on the lead 160 passes through the potentiometer 166 where the amplitude of the sidebands may be adjusted. The signal on the lead 167 is also represented by the graph 218 but is of greater amplitude as a result of the summing operation and passes into summer 172 along with the sum signal or carrier signal indicated by the signal 73 on the lead 126. In the summer 172, current passing through the resistor 178 develops a voltage representation of both the carrier signal 73 as illustrated by the graph 78 at the output of the filter 30, and the sideband signals 220 and 222 to give a combined or common signal as shown by a graph 224. It is to be noted that this combined signal contains the information obtained from the antenna 16 to indicate directional error as the two difference signals are contained in the sideband signals 220 and 222, only 90 degrees out of phase. As seen by the graph 224, the sideband signals 220 and 222 and the sum signal 70 are frequency separated by 6.3 KC. Thus, the noise associated with the signals 220 and 222 passing through the 2 KC filters 32 and 34, respectively, is not additive to the sum signal 73 passed through the filter 30. This separation substantially eliminates noise or spurious response overlap between adjacent signals on the frequency scale. This arrangement permits the use of multiplexing without sacrificing isolation between channels. The filters 30, 32, and 34 are of good quality such that the amplitude response outside of the transmission band is down 60 or more decibels, for example. The receiver of FIG. 2 illustrates frequency separation of the sum signal 73 from the sideband signals 220 and 222. The sideband signals 220 and 222 which both contain information representing each of the difference signals, maintain separation of the difference signals by their 90° phase difference.

The signal derived from the multiplexer 38 available on the lead 176 is described by $e(t) = A_1 \cos w_1 t + KA_1 \cos w_1 [\cos(w_s t + r)]$. This equation includes the sum signal $A_1 \cos w_1 t$ and includes the combined sideband signals $KA_1 \cos w_1 t [\cos(w_s t + r)]$. In these equations $$r = \tan^{-1}(K_p E_p / K_y E_y)$$

and represents the polar angle of the source of signals to the reference axis 101 of the antenna 16. Also $$K = \sqrt{(k_p E_p)^2 + (k_y E_y)^2}$$

and represents the resultant amplitude vector of the error deviation of the source of signals to the axis 101 of the antenna 16.

It can be readily recognized that the equation of the total signal on the lead 176 is equivalent to the IF signal derived from a conventional mechanically scanning system. Thus this arrangement, as discussed, has the advantage that from lead 176, the signal may be processed and coherently detected to obtain an output from the multiplexing signal source 42 in the same manner that a mechanical scan signal is processed and coherently detected to derive an output from a mechanical scan system. Accordingly, the multiplexing signal source 42 provides an electronic scan signal. Thus, one advantage of this multiplexing arrangement is that a monopulse antenna system may be utilized with an existing amplifying and detecting arrangement suitable for a conical scan system.

The single channel signal of the lead 176 then passes through the IF amplifier 180 where utilization of a single amplifier eliminates the dynamic balancing problems of the prior art multiple channel monopulse systems, as discussed. The amplified signal then passes through the envelope detector 184 which passes only the carrier signal and one sideband signal to the lead 187. As seen by a graph 228, the carrier signal appears on the lead 187 as a direct signal illustrated by a signal 230. The sideband signal is shown by a signal 232 at a frequency of 6.3 KC. The direct current signal 230 passes through a low pass filter 183 where the 6.3 KC frequency component of the signal 232 is filtered out, and is then passed to the AGC circuit 182. The AGC circuit 182 functions in response to the direct current signal 230 so that the direct current value of $A_1 \cos w_1 t$ acts to normalize the output of the amplifier 180 in order to vary the amplification so that the sum signal, which is the carrier signal on the lead 176, is maintained at a constant value.

The sideband signal 232 is then passed through the filter 186 which acts to eliminate any undesired signals which may appear in the frequency region of the direct current signal 230. The signal 232 thus appears on the output of filter 186 as shown by a graph 234. The sideband signal 232 is then passed through the amplifier 190 to the lead 198 and to the phase sensitive detectors 194 and 196. The amplifier 190 and the amplifiers 200 and 204 are utilized to appropriately adjust the amplitude of the sideband signal 232 and the reference signals from leads 144 and 145. The phase sensitive detectors 194 and 196 each act to respond only to the portion of the signal 232 which is in phase with the reference signal on the lead 201 which is connected to the −45° phase shifter 140 and the lead 202 which is connected to the +45° phase shifter 142. The equation of the signal on the lead 198 is represented by $[K \cos(w_s t + r)]$. The phases of the signals $e(t)$ on the leads 144 and 145 act to detect the two quadrature components of the resultant signal on the line 198 which are in phase with the signals on the lines 145 and 146. The angle $r$ which is the polar angle of the resultant signal as well as the polar angle of the source of signals passing to the antenna 16, is one of the factors determining the voltage level of the detected pitch and yaw components. The output signal on the lead 208 from the phase sensitive detector 194 is a direct current signal $k_p E_p$ indicating pitch error which is equal to $k \cos r$ of the signal on the lead 198. The signal on the lead 210 from the phase sensitive detector 196 is a direct current signal $k_y E_y$ which is equal to $K \sin r$ of the signal on the lead 198 or the quadrature component 90° out of phase from the component on the line 210. Thus, the receiver forms two error signals which are passed to controls, for example, to direct the path of a craft or to move the antenna 16 so the axis 101 of the antenna 16 is directed toward the target. Thus, the electronic scanning signals from the multiplexing signal source 42 act to separate the quadrature signals on the lead 198 into pitch and yaw components.

The frequency tracking system responds to the equivalent frequency of the angular velocity $w_1$ on the lead 181 to maintain the intermediate frequency at the center of the passbands of the filters 30, 32, and 34.

The multiplexing system of FIG. 2 allows the use of filtering through a narrow frequency band and separating of the signals to avoid noise interference from one channel to another while using a single IF amplifier 180. It is to be noted that this invention is applicable to systems responsive to combinations of signals other than the sum and difference signals received from the antenna 16. A plurality of signals may be received as discussed in relation to FIG. 1. With the frequency and phase multiplexing system illustrated, each set of three input signals from the antenna 16 would require a multiplexing signal source 42, each including an oscillator 138 oscillating at a separate frequency.

Thus, there has been described a monopulse radar receiver which receives and develops RF signals having amplitudes indicating target direction. The RF signals are combined into pitch and yaw difference input signals and are heterodyned to intermediate frequency signals. The receiver then utilizes narrow-band filtering of the intermediate frequency signals to eliminate undesired sideband signals. The multiplexing operation is then carried out on the filtered intermediate frequency signals in an improved multiplexer. The multiplexing operation is a combination of phase and frequency multiplexing where the pitch and yaw difference signals are phase and frequency modulated into quadrature components to form sideband signals. The sideband signals are then combined, with the sum signal combining as the carrier signal to the sideband signals to form a common signal. The common signal is amplified and detected to develop output signals which accurately indicate target direction. One advantage of the multiplexing system is that the common signal from the multiplexer may be amplified in a single IF channel and detected similar to the signal derived from a conical scan system. An advantage of the radar receiver of this invention is that the multiplexing operation requires a minimum number of oscillators and a minimum bandwidth in the amplifier channel and that more than two input signals may be utilized, thus overcoming the disadvantages of conventional frequency multiplexing and phase multiplexing systems.

What is claimed is:

1. A receiver comprising: a monopulse antenna; a sum and difference network coupled to said antenna for developing a sum signal and first and second difference signals, said signals having relative amplitudes indicative of target information; first and second modulators coupled to said network for receiving said first and second difference signals; an oscillator; first phase shifting means coupled between said oscillator and said first modulator for controlling said first modulator to phase shift said first difference signal and to modulate said first difference signal into first sideband signals; second phase shifting means coupled between said oscillator and said second modulator for controlling said second modulator to phase shift said second difference signal and to modulate said second difference signal into second sideband signals; summing means coupled to said first and second modulators for receiving said phase shifted first and second sideband signals from said first and second modulator and coupled to said network for receiving said sum signal and for combining said phase shifted signals and said sum signal into a common signal; an amplifier coupled to said summing means; and detecting means coupled to said amplifier and coupled to said first and said second phase shifting means for responding to said common signal to develop signals indicative of the relative amplitudes of said sum and difference signals developed in said network.

2. A monopulse receiver for intercepting signals from a target, said receiver comprising: a monopulse antenna for intercepting signals from a target, the intercepted signals including associated sideband noise components; a network coupled to said antenna for combining said intercepting signals to develop a pitch difference and a yaw difference signal and a sum signal, said signals including associated sideband noise components, said signals having relative amplitudes representative of direction of said target relative to said antenna filters coupled to said network for passing only a frequency band including said pitch and yaw difference signals and said sum signal and for substantially eliminating said sideband noise components; a first and a second balanced modulator coupled to said filters for receiving said pitch and yaw difference signals and for forming pitch and yaw difference sideband signals; an oscillator developing waves having a frequency greater than said frequency band; first phase shifting means coupled between said oscillator and said first modulator for controlling said first modulator to phase shift said pitch difference sideband signal; second phase shifting means coupled between said oscillator and said second modulator for controlling said second modulator to phase shift said yaw difference sideband signal; summing means coupled to said first and second modulators for receiving said phase shifted sideband signals of said pitch difference signal and said yaw difference signal and coupled to said filters for receiving said sum signal for combining said sideband signals and said sum signal into a common signal; an amplifier coupled to said summing means to amplify said common signal, an envelope detector coupled to said amplifier; automatic gain control means coupled between said envelope detector and said amplifier for controlling said amplifier and responsive to the amplitude of the component representative of said sum signal of said common signal; and phase sensitive detector means coupled to said detector and to said first and second phase shifting means for separating pitch and yaw components from said common signal, said components having amplitudes representative of said target direction.

3. A monopulse receiver responsive to signals to indicate direction of a target, said receiver comprising: a monopulse antenna for receiving the signals indicating the direction of the target; a network coupled to said antenna for forming a sum signal, a pitch difference signal and a yaw difference signal, said signals having amplitudes representative of target direction, said signals including undesired sideband signals; mixing means coupled to said network for heterodyning said sum, yaw difference, and pitch difference signals to intermediate frequency; filter means coupled to said mixing means for passing only a frequency band to include said sum, yaw difference, and pitch difference signals at intermediate frequency; balance modulating means coupled to said filter means for receiving said pitch difference and yaw difference signals at intermediate frequency and to modulate them to form pitch difference and yaw difference sideband signals; an oscillator developing a wave having a frequency greater than the frequency of said frequency band; first phase shifting means coupled between said oscillator and said balance modulating means for modulating said yaw difference sideband signal to a first phase; second phase shifting means coupled between said oscillator and said balance modulating means for modulating said pitch difference sideband signal to a second phase different from said first phase; summing means coupled to said balance modulating means for receiving said pitch and yaw difference sideband signals and coupled to said filter means for receiving said sum signal, said summing means combining said sideband signals and said sum signal into a common signal; an amplifier connected to said summing means for amplifying said common signal; and signal separating means coupled to said amplifier and coupled to said first and second phase shifting means for separating said common signal into output components having values representative of said target direction.

4. A monopulse receiver responsive to signals from a target, said signals including a carrier wave and sideband noise components, said receiver comprising: a monopulse antenna having four horns for receiving said signals from the target; combining means coupled to said horns for forming a sum signal and first and second difference signals, each signal including a carrier wave and sideband noise components, the amplitude of said carrier waves being indicative of direction of said target relative to said antenna; mixing means coupled to said combining means for heterodyning said sum and difference signals to intermediate frequency; filters coupled to said mixers for filtering out said sideband noise components and passing said intermediate frequency sum and difference signals; a first and a second balanced modulator coupled to said filters for receiving said first and second intermediate frequency difference signal, said modulators suppressing the intermediate frequency difference signals while forming sideband difference signals; an oscillator for forming a wave having a greater frequency than the bandwidth of said filters; phase shifting means coupled between said oscillator and said first and second modulator for phase controlling said modulators to shift said sideband difference signals into quadrature relation relative to each other; summing means coupled to said first and second modulators for receiving said first and second phase shifted sideband difference signals and coupled to said filters for receiving said intermediate frequency sum signal, said summing means combining said sum signal and said phase shifted sideband difference signals into a combined signal; an intermediate frequency amplifier coupled to said summing means for amplifying said combined signal; an envelope detector coupled to said amplifier for separating said sum signal to develop a normalizing signal and coupled to said amplifier for passing said normalizing signal to control said amplifier; and a first and a second phase sensitive detector coupled to said envelope detector and coupled to said phase shifting means for separating said sideband difference signals into output signals which indicate direction of said target with a high degree of accuracy.

5. A multiplexer for a monopulse receiver having antenna means for receiving signals from a target and for developing sum, pitch difference and yaw difference waves, said antenna means having a referenced axis, said waves having amplitudes indicative of direction of said target relative to said referenced axis, said antenna means developing sideband noise components, and said antenna means having filter means for filtering out said sideband components from said sum, pitch and yaw waves, said multiplexer comprising: a first balanced modulator coupled to said antenna means for receiving and suppressing said said pitch difference waves and forming sideband signals therefrom; a second balanced modulator coupled to said antenna means for receiving and suppressing said yaw difference waves, and forming sideband signals therefrom; an oscillator for developing a reference wave; first phase shifting means coupled between said oscillator and said first modulator to pass said reference wave to said first modulator at a first phase for controlling said first modulator to shift said sideband signals of said pitch difference signal to a first phase relation; second phase shifting means coupled between said oscillator and said second modulator to pass said reference wave to said second modulator at a second and different phase for controlling said second modulator to shift said sideband signals of said yaw difference signal to a second phase relation; summing means coupled to said first and second modulator to receive said sideband signals with said first and second phase relations and coupled to said antenna means to receive said sum wave, said summing means combining said sideband signals and said sum wave into a common signal; an amplifier coupled to said summing means for amplifying said common signal, detecting means coupled to said amplifier for detecting a sum wave component of said common signal; automatic gain control means coupled between the output of said detecting means and said amplifier to control the amplification of said amplifier in response to the amplitude of said sum signal component of said common signal; first phase detector means coupled to said detecting means and to the output of said first phase shifting means for segregating out a pitch difference component from said common signal; and second phase detector means coupled to said detecting means and coupled to the output of said second phase shifting means for segregating out a yaw difference component from said common signal, whereby the amplitude characteristics of said pitch and yaw difference components are indicative of the direction of said target.

6. A system for multiplexing a first, second and third intermediate frequency wave, each having noise sidebands, said waves having amplitudes indicative of directional information, said system comprising: a source of said first, second, and third intermediate frequency waves; filter means coupled to said source for passing said first, second, and third waves and filtering out said noise sidebands; a first and a second modulator coupled to said source for receiving said first and second waves, respectively, said first and second modulators developing first and second pairs of sideband signals from said first and second carrier waves; an oscillator; phase shifting means coupled between said oscillator and said first and second modulators for controlling said modulators to shift the phase of said first and second pairs of sideband signals 90° in relation to each other; a summer coupled to said first and second modulator for receiving the phase shifted first and second pairs of sideband signals and coupled to said filter means for receiving said third intermediate frequency wave, said summer combining said first and second pair of sideband signals and said third intermediate frequency wave to form a combined signal; and means coupled to said summer and to said phase shifting means for separating components from said combined signal representative of said directional information of said first, second, and third intermediate frequency waves.

7. A receiver comprising: antenna means for receiving informational signals from a source and for developing a first signal and a pair of second signals, each of the signals being at intermediate frequency and indicative of the information received by said antenna means; a pair of balanced modulators coupled to said antenna means for receiving said pair of second signals; a pair of phase shifters each being coupled to one of said balanced modulators for phase shifting each of the signals of said pair of second signals ninety degrees in relation to each other; an oscillator coupled to said pair of phase shifters to form sideband signals from each of said second signals; a summer coupled to said antenna means and to said pair of balanced modulators for receiving said first signal and said sideband signals, said summer combining said first signal and said sideband signals into a common signal; a common amplifier coupled to said summer for amplifying said common signal; an envelope detector coupled to said amplifier for separating a component representative of said first signal from the amplified common signal; and a pair of phase sensitive detectors coupled to said envelope detector and each coupled to one of said phase shifters for separating components representative of said second signals from said amplified common signal, thereby providing components indicating the information received by said antenna means.

8. In a receiver for a monopulse radar system responding to signals from a source, a combination comprising: a monopulse antenna for intercepting the signals from said source; combining means coupled to said antenna for forming sum carrier signals and first and second difference carrier signals having relative amplitudes representative of direction of said source from said antenna; first, second and third mixing means coupled to said combining means for heterodyning said respective sum carrier signal, said first difference carrier signal and said second difference carrier signal to respective sum, first difference and second difference intermediate frequency signals; first, second and third filter means respectively coupled to said first, second and third mixing means for passing only a desired bandwidth of each of said intermediate frequency signals; first and second balanced modulating means coupled to said second and third filter means for respectively receiving said first and second difference intermediate frequency signals for forming sideband signals and for suppressing said difference intermediate frequency signals; an oscillator; phase shifting means coupled between said oscillator and said first and second modulating means for controlling said modulating means to shift each of said sideband signals of said difference intermediate frequency signals to a separate phase; summing means coupled to said first and second modulating means for receiving the phase shifted sideband signals and coupled to said first filter means for receiving said sum intermediate frequency signal, said summing means combining said signals to form a common signal; an amplifier coupled to said summing means; detecting means coupled to said amplifier and to said phase shifting means for demodulating said common signal to develop signals having relative amplitudes indicative of said relative amplitudes of said sum carrier signals and said first and second difference carrier signals, thereby representing the direction of said source from said antenna.

* * * * *